United States Patent [19]
Wang

[11] Patent Number: 5,133,421
[45] Date of Patent: Jul. 28, 1992

[54] WEIGHING SCALE WITH IMPROVED LEVER AND FULCRUM ASSEMBLY

[75] Inventor: John Wang, Chiayi, Taiwan
[73] Assignee: Lee Wang Industry Ltd., Taiwan
[21] Appl. No.: 743,219
[22] Filed: Aug. 9, 1991
[51] Int. Cl.$^5$ .............................................. G01G 21/08
[52] U.S. Cl. .................................... 177/256; 177/257; 177/254; 177/208
[58] Field of Search ............... 177/208, 256, 257, 258, 177/259, 254

[56] References Cited
U.S. PATENT DOCUMENTS

| | | | |
|---|---|---|---|
| 971,757 | 10/1910 | Jones | 177/256 |
| 1,539,601 | 5/1925 | Riedel | 177/256 |
| 3,666,032 | 5/1972 | Maffia et al. | 177/256 |
| 3,831,687 | 8/1974 | Maffia et al. | 177/257 X |
| 4,479,562 | 10/1984 | Mairot et al. | 177/256 |

*Primary Examiner*—Benjamin R. Fuller
*Assistant Examiner*—R. W. Gibson
*Attorney, Agent, or Firm*—Harness, Dickey & Pierce

[57] ABSTRACT

A weighing scale includes a hollow casing having a lower base and an upper covering for support an object. A pressure gauge mounted to the base includes an indicator, and a hydraulic pressure sensor connected to the indicator and actuating it in response to a sensed pressure produced by the weight of the object. Four spaced fulcrum posts are mounted to the base. A lever mechanism includes a rear one-piece rod and a pair of spaced front rods respectively and pivotably mounted to the four fulcrum posts. The rear one-piece rod includes a force exerting plate resting on the hydraulic pressure sensor. A transmitting frame provided between the covering and the lever mechanism includes a pair of spaced rods and a connecting rod mounted between the spaced rods which are pivotally mounted to the lever mechanism.

4 Claims, 4 Drawing Sheets

WEIGHING SCALE WITH IMPROVED LEVER AND FULCRUM ASSEMBLY

BACKGROUND OF THE INVENTION

1. Field of the Invention

This invention relates to measuring of weight, more particularly to a weighing scale.

2. Description of the Related Art

Referring to FIGS. 1 and 2, a conventional weighing scale for measuring the weight of an object or a person includes a hollow casing having a lower base (A) with a front (A') and a rear section (A"), and an upper outer covering (I) having decorative patterns formed thereon which is made of a plastic material by injection-molding and used for supporting the object or the person thereon. A pressure gauge (C) includes an indicator (C'), a pressure sensor (D) connected to the indicator (C') sensing a pressure produced by the weight and hydraulically actuating the indicator (C') in response to the sensed pressure, and an oil pump (E) having an oil passage connected to the pressure sensor (D) for resetting the indicator (C') to an initial zero position.

Two spaced front fulcrum members (B) with V-shaped notches (B1) are fixed to the front section (A') of the base (A). Two spaced rear fulcrum members (B) with V-Shaped notches (B1) are fixed to the rear section (A") of the base (A).

A lever mechanism (G) has a lever means (G'). The lever means (G') includes a pair of spaced elongated plate members (G2) extending forwards and inwards from the rear section (A") toward the front section (A') and having first front and first rear end portions, a connecting elongated plate member (G3) mounted between the two spaced elongated plate members (G2) adjacent the first rear end portions thereof, and a force exerting plate (G1) fixed to the two spaced elongated plate members (G2) adjacent the first front end portions thereof and resting on the pressure sensor (D). The first rear end portions of the two spaced elongated plate members (G2) have V-shaped notches (G41) engaging the V-shaped notches (B1) of the rear fulcrum members (B).

The lever mechanism (G) further has a pair of spaced plate-shaped levers (G6) extending rearward and inwards from the front section (A') toward the rear section (A"). The pair of the levers (G6) have second front and second rear end portions respectively having V-shaped notches (G7) formed thereon. The levers (G6) are movably mounted to the front fulcrum members (B) by the V-shaped notches (G7) of the second front end portions engaging the V-shaped notches (B1) of the front fulcrum members (B). The levers (G6) are movably mounted to the lever means (G') by the V-shaped notches (G7) of the second rear end portions engaging two loop retainers (G5) of the lever means (G').

A transmitting means includes an inner covering (H) which is provided between the outer covering (I) and the lever mechanism (G) for transmitting the weight from the outer covering (I) to the force exerting plate (G1) to press the pressure sensor (D). The inner covering (H) includes four retaining members (H2) having four members (H4) with V-shaped notches (H3). The inner covering (H) is movably mounted to the lever mechanism (G) by the V-shaped notches (H3) engaging V-shaped notches (G4) of the levers (G6) and the elongated plate members (G2). A pair of springs (H6) are connected to the inner covering (H) and the base (A). The outer covering (I) is movably covered on the inner covering (H).

When an object is placed, or a person stands onto, the outer covering (I), the weight of the object or the person will be transmitted to cause the force exerting plate (G1) to press against the pressure sensor (D) to hydraulically actuate the indicator (C'), so the weight is converted into the movement of the indicator (C') and displays the weight measure of the object or person.

The above construction is complicated. Since all elements of the base (A), the fulcrum members (B), the lever mechanism (G), and the outer covering (H) are fabricated by die-cutting metal sheets, a lot of dies are needed for the manufacturing and the welding between the elements is also required. The increased cost of the dies and the labor for welding is not economical. Furthermore, it is wasteful that much unused metal material must be disposed of after diecutting.

SUMMARY OF THE INVENTION

Therefore, one objective of the invention is to provide a weighing scale having a simple construction which is fabricated without dies and welding work. Another objective is to provide a weighing scale having lower manufacturing cost than the conventional weighing scale.

Accordingly, a weighing scale of this invention for measuring the weight of an object or a person includes a hollow casing having a lower base with a front and a rear section, and an upper covering for supporting the object or the person. A pressure gauge mounted to the base includes an indicator, and a pressure sensor connected to the indicator sensing a pressure produced by the weight and actuating the indicator in response to the sensed pressure. A plurality of spaced front fulcrum members are fixed to the front section of the base, and a plurality of spaced rear fulcrum members are fixed to the rear section of said base. A lever mechanism includes a rear lever means which has a first front end portion, a first rear end portion movably mounted to the rear fulcrum members, and a force exerting plate member fixed to the first front end portion and resting on the pressure sensor. The lever mechanism further includes a pair of spaced front levers each of which has a second front end portion movably mounted to one of the front fulcrum members and a second rear end portion movably mounted to the rear lever means adjacent to the first front end portion thereof. A transmitting means is provided between the covering and the lever mechanism for transmitting the weight from the covering to the force exerting plate member of the lever mechanism to press the pressure sensor. The transmitting means are movably mounted to the lever mechanism. The covering is provided on the transmitting means.

The weighing scale of this invention is characterized in that the rear lever means of the lever mechanism includes a one-piece member having a plurality of slots formed thereon adjacent to the first rear end portion thereof. The pair of front levers of the lever mechanism has a plurality of slots formed thereon adjacent to the second front end portion thereof. Each of the front and rear fulcrum members includes a post having a pin projecting upwards into one of the slots of the front levers and the rear lever means. The transmitting means includes a pair of spaced rods extending from the front section of the base towards the rear section of the base, and an interconnecting rod mounted between the pair of spaced rods. Each of the spaced rods has a front and a rear post extending downward. Each of the front and rear posts has a pin projecting downward into one of the slots of the front levers and the rear lever means.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 3:
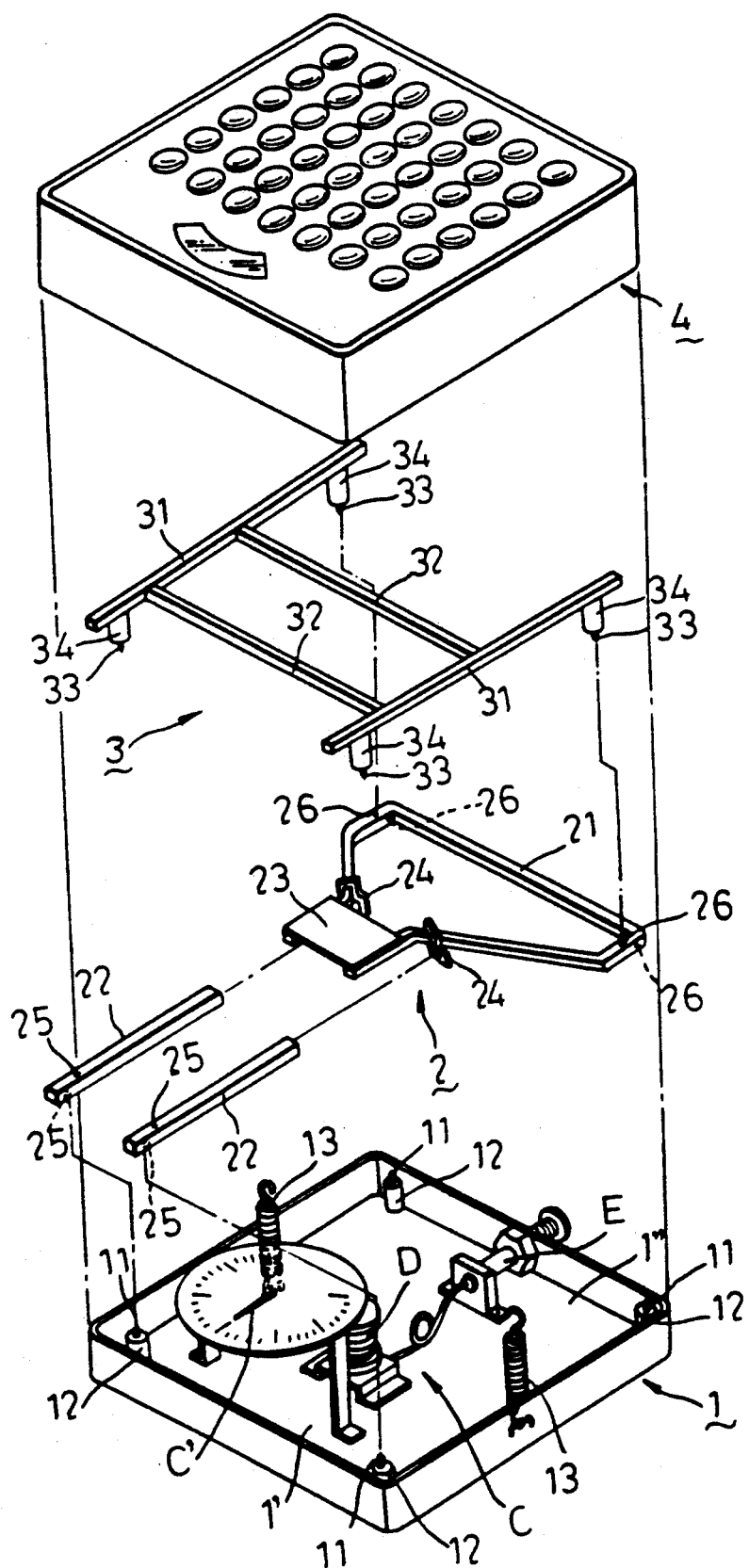
FIG. 3 is an exploded view of the weighing scale of this invention.
Figure 4:
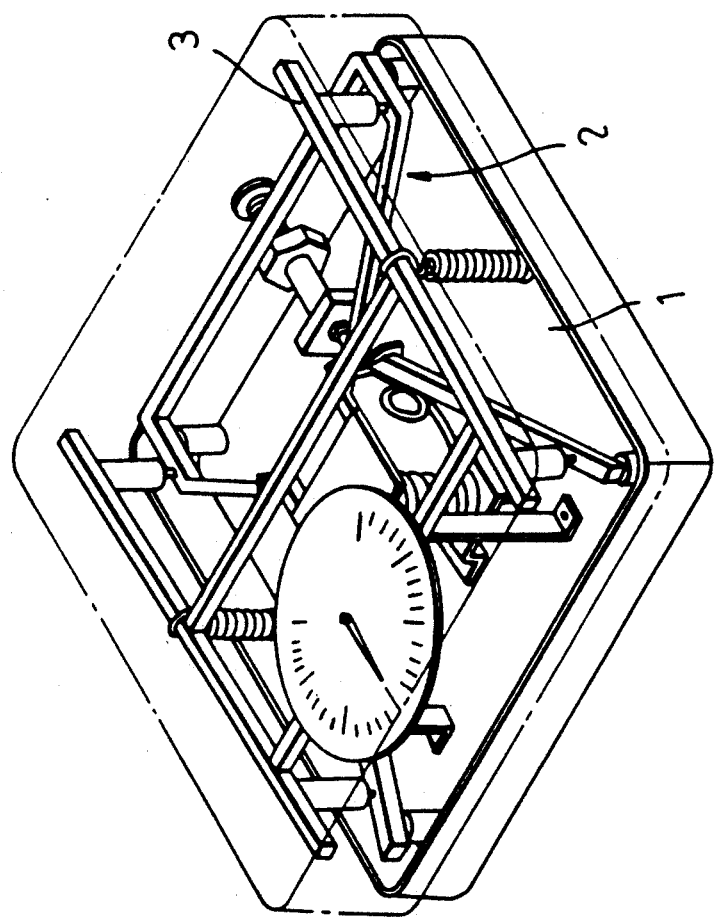
FIG. 4 is a schematic perspective view of the weighing scale in FIG. 3.

Referring to FIGS. 3 and 4, a weighing scale of this invention includes a hollow casing having a lower base (1) with a front and a rear section (1', 1''), and an upper covering (4) for supporting an object or a person thereon. The covering (4) is made of a plastic material by injection-molding and has a variety of patterns formed thereon. A pressure gauge (C), mounted to the base (1), which is like the pressure gauge (C) in FIG. 1, includes an indicator (C'), a hydraulic pressure sensor (D), and an oil pump (E).

A lever mechanism (2) includes one-piece rod (21) of a rectangular cross-section which has a generally U-shaped section with slots (26) formed thereon and a pair of front converging sections extending from the U-shaped section. A force exerting plate (23) is fixed to the pair of front converging sections of the one-piece rod (21) and rested on the pressure sensor (D). The lever mechanism (2) further has a pair of spaced rods (22) of rectangular cross-sections. The rods (22) have front end portions with slots (25) formed thereon and rear end portions respectively movably mounted to two loop retainers (24) of the one-piece rod (21).

Two spaced front posts (12) are fixed to the front section (1') of the base (1) and both have pins (11) projecting upwards into the slots (25) of the lever rods (22). Two spaced rear posts (12) are fixed to the rear section (1'') of the base (1) and both have pins (11) projecting upwards into the slots (26) of the U-shaped section of the one-piece rod (21).

A transmitting means has a frame (3) which includes a pair of spaced rods (31) extending from the front section (1') to the rear section (2'), and a pair of spaced connecting rods (32) mounted between the rods (31). Each of the rods (31, 32) of the frame (3) has a rectangular cross-section. The rods (31) include two front posts (34) having pins (33) projecting downwards into the slots (25) of the rods (22), and two rear posts (34) having pins (33) projecting downwards into the slots (26) of the U-shaped section of the one-piece rod (21). A pair of springs (13) are connected to the rods (31) and the base (1) The covering (4) is provided on the frame (3). When an object is placed, or a person stands onto the covering (4), the weight of the object or the person will be transmitted and cause the force exerting plate (23) to press against the hydraulic pressure sensor (D) to hydraulically actuate the indicator (C'), so the weight is converted into the movement of the indicator (C') to display the weight measure of the object or person.

Figure 1:
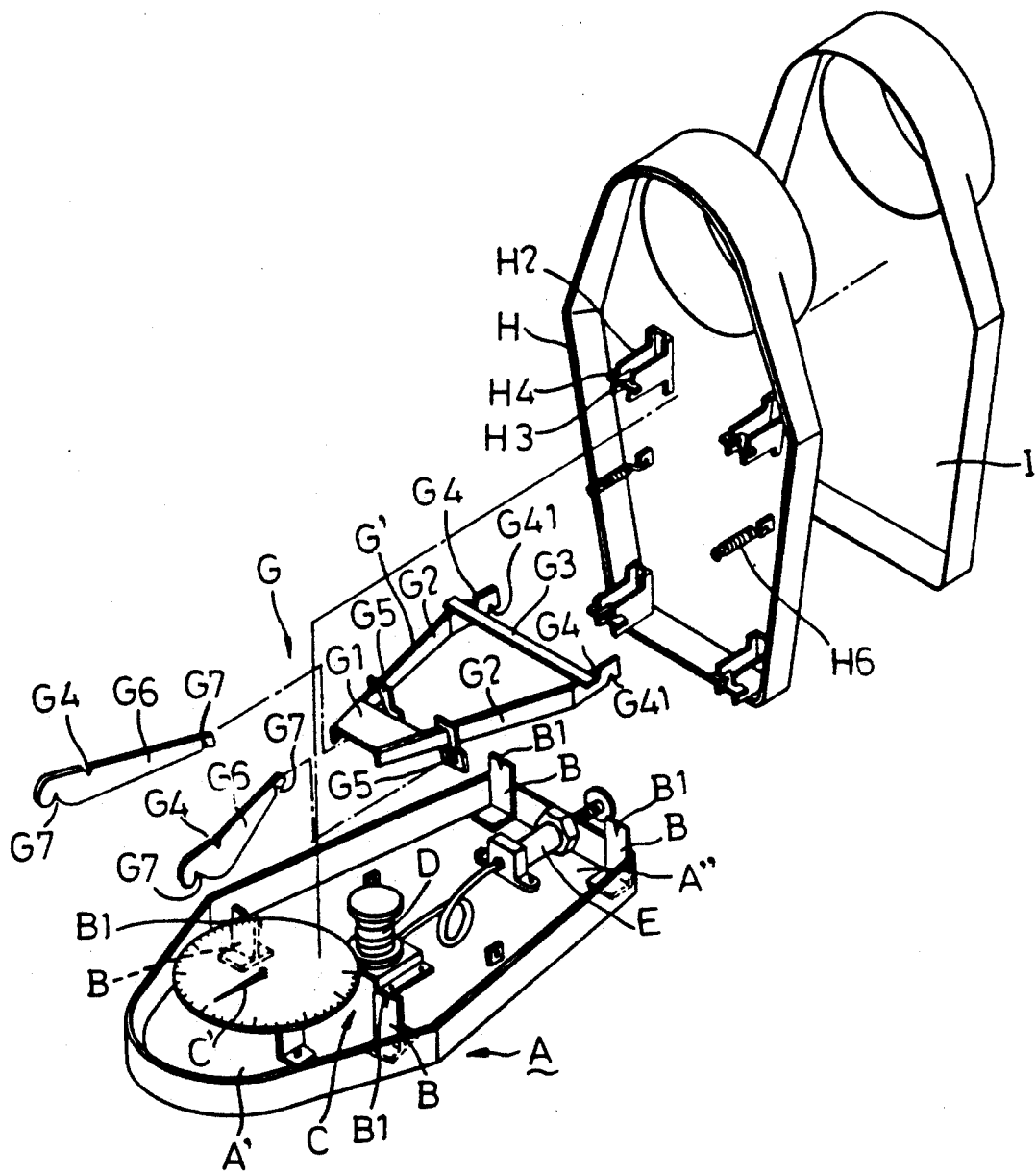
FIG. 1 is an exploded view of a conventional weighing scale.
Figure 2:
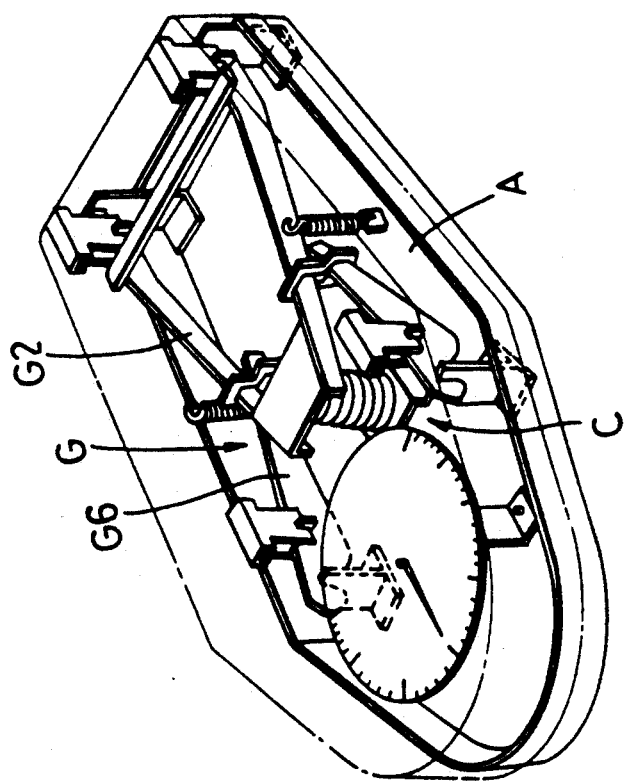
FIG. 2 is a schematic perspective view of the conventional weighing scale.

All elements of the posts (12), the lever mechanism (2), and the frame (3) are made from machining rods, therefore they are more easily to be constructed than the fulcrum members (B), the lever mechanism (G) and the inner covering (H) of the conventional weighing scale in FIG. 1 which are fabricated by die cutting metal sheets with several dies to form particular shapes.

Therefore, the weighing scale of this invention is fabricated without dies and has a lower manufacturing cost than the conventional weighing scale.

While the present invention has been described in connection with what is considered the most practical and preferred embodiment, it is understood that this invention is not limited to the disclosed embodiment, but is intended to cover various arrangements included the spirit and scope of the broadest interpretations and equivalent arrangements.

I claim:

1. A weighing scale for measuring a weight of an object or a person comprising:

a hollow casing having a lower base with a front and a rear section, and an upper covering for supporting said object or said person;

a pressure gauge mounted to said base including an indicator, and a pressure sensor connected to said indicator sensing a pressure produced by said weight and actuating said indicator in response to the sensed pressure;

a plurality of spaced front fulcrum members fixed to said front section of said base, and a plurality of spaced rear fulcrum members fixed to said rear section of said base;

a lever mechanism including a rear lever having a first front end portion, a first rear end portion movably mounted to said rear fulcrum members, and a force exerting plate member fixed to said first front end portion and resting on said pressure sensor;

said lever mechanism further including a pair of spaced front levers, each of which having a second front end portion movably mounted to one of said front fulcrum members and a second rear end portion movably mounted to said rear lever adjacent to said first front end portion thereof; and a transmitting means provided between said covering and said lever mechanism for transmitting said weight from said covering to said force exerting plate member of said lever mechanism to press said pressure sensor, said transmitting means being movably mounted to said lever mechanism, said covering being provided on said transmitting means;

said rear lever of said lever mechanism including a one-piece member having a plurality of slots formed thereon adjacent to said first rear end portion thereof;

said pair of front levers of said lever mechanism having a plurality of slots formed thereon adjacent to said second front end portion thereof;

each of said front and rear fulcrum members including a post having a pin projecting upwards into one of said slots of said front levers and said rear lever of said lever mechanism; and said transmitting means including a pair of spaced rods extending from said front section of said base towards said rear section of said base, and an interconnecting rod mounted between said pair of spaced rods, each of said spaced rods having a front and a rear post extending downward, each of said front and rear posts having a pin projecting downward into one of said slots of said front levers and said rear lever means of said lever mechanism.

2. A weighing scale as claimed in claim 1, characterized in that each of said front levers of said lever mechanism is a rod, said one-piece member of said lever mechanism being a one-piece rod including a generally U-shaped section and a pair of front converging sections extending from said U-shaped section.

3. A weighing scale as claimed in claim 2, characterized in that each of said rods of said lever mechanism has a rectangular cross-section.

4. A weighing scale as claimed in claim 1, characterized in that each of said rods of said transmitting means has a rectangular cross-section.

* * * * *